United States Patent Office 3,429,778
Patented Feb. 25, 1969

3,429,778
SYNTHESIS OF STEROIDS
Samuel Cheng Pan, Metuchen, Barbara Junta, Somerset, and Pacifico A. Principe, South River, N.J., assignors to E. R. Squibb & Sons, Inc., New York, N.Y., a corporation of Delaware
No Drawing. Original application Feb. 15, 1966, Ser. No. 527,501. Divided and this application Aug. 24, 1967, Ser. No. 671,524
U.S. Cl. 195—51          4 Claims
Int. Cl. C12d 13/08

ABSTRACT OF THE DISCLOSURE

7β-hydroxyestranes are prepared by a two-step process. In the first step a 19-nor-Δ⁴-androstene is subjected to the action of enzymes of a 7β-hydroxylating microorganism to form the corresponding 7β-hydroxy-19-nor-Δ⁴-androstene derivative. The latter compound is then subjected to the action of enzymes of a 1-dehydrogenating microorganism to yield the final 7β-hydroxyestrane product.

---

This application is a division of application, Ser. No. 527,501, filed Feb. 15, 1966.

This invention relates to and has for its object the provision of an improved process for preparing 7β-hydroxyestranes and to the new steroids formed thereby.

It has been found that a 19-nor-Δ⁴-androstene may be converted to a 7β-hydroxyestrane derivative in high yield by a two-step process without any substantial formation of undesired by-products. In essence, therefore, the process of this invention entails subjecting a 19-nor-Δ⁴-androstene to the action of enzymes of a 7β-hydroxylating microorganism, whereby a corresponding 7β-hydroxy-19-nor-Δ⁴-androstene derivative is formed; and subjecting the latter to the action of enzymes of a 1-dehydrogenating microorganism, to yield the desired 7β-hydroxyestrane final product.

Among the suitable starting steroids are included any of the 19-nor-Δ⁴-androstenes. The preferred starting steroids, however, are the 3,17-dioxygenated-19-nor-Δ⁴-androstenes, such as 19-nor-Δ⁴-androstene-3,17-dione, 19-nortestosterone, 19-nor-17α-methyltestosterone and 19-nor-17α-ethynyltestosterone.

In the first step of the process of this invention, the steroid substrate is subjected to the action of enzymes of a 7β-hydroxylating microorganism, the reaction being carried out in the usual manner by culturing the microorganism in the presence of the steroid, or by treating the steroid with nonproliferating cells of the microorganism, or by intermixing the steroid with 7β-hydroxylating enzymes previously obtained from the microorganism. The conditions for such microbial reaction are well known in the art and are similar to those specified in U.S. Patent 3,179,698.

Any 7β-hydroxylating microorganism can be used as the source of the 7β-hydroxylating enzyme. Such microorganisms include, inter alia, *Diplodia natalensis*, *Aspergillus niger*, *Thamnidium elegans*, *Coniothyrium hellebori* and *Phycomyces blakesleeanus*.

The process results in the preparation of the 7β-hydroxy-19-nor-Δ⁴-androstene intermediates which are new compounds of this invention. The preferred intermediates are the 7β-hydroxy-3,17-dioxygenated-19-nor-Δ⁴-androstenes, such as 19-nor-Δ⁴-androstene-7β-ol-3,17-dione, 7β-hydroxy - 19 - nortestosterone, 7β - hydroxy-19-nor-17α-methyltestosterone, and 7β-hydroxy - 19 - nor - 17α-ethylnyltestosterone.

These 7β-hydroxy-19-nor-Δ⁴-androstenes are then subjected to the action of enzymes of 1-dehydrogenating microorganisms, to yield the desired 7β-hydroxyestrane final products, the reaction being carried out in the usual manner by culturing the microorganism in the presence of the steroid, or by treating the steroid with non-proliferating cells of the microorganism, or by intermixing the steroid with 1-dehydrogenating enzymes previously obtained from the microorganisms. Optimally the dehydrogenation is conducted with cell-free extracts of 1-dehydrogenating microorganisms, as by the method and with the enzymes described in U.S. Patent No. 3,047,469.

The second step of the process results in the formation of the final products, namely the 7β-hydroxyestrane derivatives, which include the 7β-hydroxy-3,17-dioxygenated estranes, such as 7β-hydroxyestrone, 7β-hydroxyestradiol, 7β-hydroxy - 17α - methylestradiol and 7β-hydroxy-17α-ethynylestradiol.

The following examples illustrate the invention (all temperatures being in centigrade):

Example 1.—7β-hydroxy-19-nor-Δ⁴-androstene-3,17-dione

A. Fermentation.—Surface growth from each of three 10-day old agar slant cultures of *Diplodia natalensis* (ATCC 9055), the slant containing as a nutrient medium (A):

|  | Grams |
|---|---|
| Glucose | 10 |
| Yeast extract | 2.5 |
| K₂HPO₄ | 1 |
| Agar | 20 |

Distilled water to 1 liter.

is suspended in 5 ml. of a 0.01% sodium lauryl sulfate aqueous solution. One ml. portions of the suspension are used to inoculate ten 250 ml. conical flasks, each containing 50 ml. of the following sterilized medium (B):

|  | Grams |
|---|---|
| Dextrose | 10 |
| Corn steep liquor | 6 |
| NH₄H₂PO₂ | 3 |
| Yeast extract | 2.5 |
| CaCO₃ | 2.5 |

Distilled water to 1 liter.

After 72 hours of incubation at 25° with continuous rotary agitation (280 cycles per minute; 2 inch stroke), 10% (vol./vol.) transfers are made to forty 250 ml. conical flasks each containing 50 ml. of freshly sterilized medium B plus 500 micrograms/ml. of 19-nor-Δ⁴-androstene-3,17-dione. The steroid is added by supplementing each flask with 0.25 ml. of a sterile solution of the steroid in N,N-dimethylformamide containing 100 mg./ml. of steroid. A total of 1.0 gram is used. After 7 days of further incubation, the contents of the flasks are pooled through a Seitz clarifying pad. The flasks, mycelium and pads are washed with successive 50 ml. portions of warm water. The combined filtrate and washings have a volume of 2,000 ml.

B. Isolation and Characterization.—The combined filtrate and washings (2,000 ml.) are extracted three times with 500 ml. portions o methyl isobutyl ketone. The combined methyl isobutyl ketone extracts are washed with water, dried over anhydrous sodium sulfate and concentrated to dryness under vacuum, leaving about 500 mg. of crude product. This material is chromatographed on a thin layer of silica Gel GF (Merck) with chloroform containing 5% (by volume) methanol as the developing solvent. The UV-absorbing band which moves with approximately 3/10 mobility of the substrate, 19-norandrostenedione, is eluated with a 1:1 (by volume) mixture of methanol and chloroform. After evaporating off the solvent, the residue is partitioned between chloroform and a 1:1 (by volume) mixture of water and methanol. The chloroform phase, upon evaporation under vacuum to dryness, yields crystalline 7β-hydroxy-19-nor-Δ⁴-androstene-3,17-dione. It is recrystallized from acetone-hexane to yield about 15 ml. of the pure product, M.P. about 208–209° C.; $[\alpha]_D^{23}+127°$ (C, 0.52, chloroform);

$\lambda_{max}^{alc.}$ 241 mμ (ε=15,800). $\gamma_{max}^{KBr}$ 3370, 1730, 1639, 1603 cm.⁻¹

Example 2

Following the procedure of Example 1, but substituting an equivalent amount of 19-nortestosterone for the 19-nor-Δ⁴-androstene - 3,17 - dione, 7β - hydroxy-19-nor-Δ⁴-androstene-3,17-dione having a M.P. o about 208–209° C. is obtained.

Example 3

Following the procedure of Example 1, but substituting *Aspergillus niger* ATCC 9142 for the Diplodia, 7β-hydroxy-19-nor-Δ⁴-androstene-3,17-dione is obtained.

Similarly, by following the procedure of Example 1, but substituting the following microorganisms for the Diplodia used in the example, 7β-hydroxy-9-nor-Δ⁴-androstene-3,17-dione is obtained: *Thamnidium elegans* QM–545 (Army Quartermaster, Natick, Mass.), *Phycomyces blakesleeanus* (Centrallbureau voor Schimmelcultures, Baarn, Netherlands) and *Coniothyrium hellebori* ATCC 12522.

Moreover, by substituting the following steroid substrates for the 19-nor-Δ⁴-androstene-3,17-dione in the procedure of Example 1, the indicated product is obtained:

Steroid substrate:                      Product
19-nor-17α-methyl-         7β-hydroxy-19-nor-17α-
  testosterone              methyltestosterone
19-nor-17α-ethynyl-         7β-hydroxy-19-nor-17α-
  testosterone              ethynyltestosterone Example 4.—7β-hydroxyestrone by growing culture of *Corynebacterium simplex*

A. Fermentation.—Surface growth from a two-week old agar slant of *Corynebacterium simplex* (ATCC 6946), the slants containing as a nutrient medium (A):

| | Grams |
|---|---|
| Glucose | 10 |
| Yeast extract | 2.5 |
| K₂HPO₄ | 1 |
| Agar | 20 |

Distilled water to 1 liter.

is suspended in 5 ml. of 0.01% aqueous sodium lauryl sulfate solution. One ml. portions of this suspension are used to inoculate our 250 ml. Erlenmeyer flasks, each containing 50 ml. of the ollowing sterilized medium (B):

| | Grams |
|---|---|
| Beef extract | 1.5 |
| Yeast extract | 3 |
| Peptone | 6 |
| Dextrose | 1 |

Distilled water to 1 liter.

After 24 hours of incubation at 25° with continuous rotary agitation (285 cycles/minute; 2 inch stroke), 5% (vol./vol.) transfers are made to eight 250 ml. Erlenmeyer flasks each containing 50 ml. of freshly sterilized medium B. After 24 hours of further incubation, using the same conditions as described above, the steroid, (250 micrograms/ml.) is added by supplementing each flask with 0.25 ml. of a sterile solution (50 mg./ml.) of 7β-hydroxy-19-nor-Δ⁴-androstene-3,17-dione in N,N - dimethylformamide. A total of 100 mg. is fermented. After 48 hours of further incubation, using identical conditions as described above, the contents of the flasks are pooled, and the broth is extracted three times with 200 ml. portions of methyl isobutyl ketone. Upon evaporation of the combined extract under vacuum to dryness, crystalline 7β-hydroxyestrone is obtained. It is recrystallized twice from acetone-hexane to yield about 80 mg. of the pure product, M.P. 261–262°, $[\alpha]_D+150°$ (dioxane), $\gamma_{max}^{KBr}$ 3490, 3280, 1720, 1621, 1587, 1503 cm.⁻¹.

Example 5.—7β-hydroxyestrone by washed cells of *Corynebacterium simplex*

Following the procedure of Example 4 with the exception that testosterone is used in place of 7β-hydroxy-19-norandrostenedione, the cells of the culture of *Corynebacterium simplex* are harvested at the end of 72 hours by centrifugation. The packed cells are washed three times with a phosphate buffer containing 0.005 mole each of KH₂PO₄ and Na₂H₂P₂O₇ per liter and adjusted to pH 7.0. The washed cells are then suspended in the same phosphate buffer to a volume equal to one-quarter of the volume of the original culture. The substrate, 7β-hydroxy-19-norandrostenedione and the hydrogen acceptor, e.g., 2-methyl-naphthoquinone are added as their solutions in ethanol to give final concentrations of 100 μg./ml. and 0.4 mM., respectively, the quantity of ethanol introduced being held within 5% of the total. The reaction mixture is allowed to stand at 30° for 4 to 6 hours, after which it is extracted twice with one-quarter of its volume of methyl isobutyl ketone. The methyl isobutyl ketone extract is washed twice with water and dried over anhydrous sodium sulfate. Upon evaporating off the solvent to dryness, 7β-hydroxyestrone is obtained as crystalline residue. It is recrystallized from acetone-n-hexane, M.P. 261°–262°, $[\alpha]_D+150°$ (dioxane).

Example 6.—7β-hydroxyestrone by cell-free enzyme preparation from *Corynebacterium simplex*

Following the procedure of Example 5, the packed cells are placed in a mortar along with an equal amount by weight of alumina (finely powdered) and treated in a Raytheon magnetostrictive oscillator for 20 minutes. The sonicated mixture is centrifuged for ten minutes at 2000× G to remove cell debris and alumina. The substrate, 7β-hydroxy-19-norandrostenedione (1 mg.) and the hydrogen acceptor, e.g., 2-methyl-naphthoquinone (1 mg.) are added to 2 ml. of this cell-free ring-A dehydrogenase preparation which has been diluted to 5 ml. with pH 7.0 phosphate buffer in the same manner as described in Example 5. The mixture is allowed to stand for one hour at 30° C. after which it is twice extracted with 1 ml. of methyl isobutyl ketone. The combined extract is chromatographed on paper using ethylene glycol as the stationary phase and a mixture of equal volumes of benzene and chloroform as the mobile phase. A spot moving with the same $R_f$ (0.12) and exhibiting the same characteristic color reactions as the 7β-hydroxyestrone obtained in Example 4 is observed.

Similarly, by substituting the following 1-dehydrogenating microorganisms for the *Corynebacterium simplex* in Examples 4, 5, and 6, the same products are formed: *Nocardia restrictus* ATCC–14887, *Pseudomonas testosteroni* ATCC–11996, *Cylindrocarpon radicicola* ATCC–11011, and *Mycobacterium rhodochrous* ATCC–4277.

The invention may be variously otherwise embodied within the scope of the appended claims.

What is claimed is:

1. A process for preparing a 7β-hydroxy-Δ¹,³,⁵⁽¹⁰⁾-estratriene, which comprises subjecting a 19 - non - Δ⁴-androstene serially to the action of enzymes of the 7β-hydroxylating microorganism *Diplodia natalensis* and enzymes of a 1-dehydrogenating microorganism.

2. The process of claim 1 wherein the androstene is 19-nor-Δ⁴-androstene-3,17-dione.

3. A process for preparing a 7β-hydroxy-19-nor-Δ⁴-androstene, which comprises subjecting a 19-nor-Δ⁴-androstene to the action of enzymes of *Diplodia natalensis* and recovering the 7β - hydroxy - 19 - nor - Δ⁴ - androstene produced.

4. The process of claim 3, wherein the androstene is 19-nor-$\Delta^4$-androstene-3,17-dione.

References Cited

UNITED STATES PATENTS

| | | | |
|---|---|---|---|
| 2,844,513 | 7/1958 | Wettstein et al. | 195—51 |
| 2,902,410 | 9/1959 | Weintraub et al. | 195—51 |
| 2,928,850 | 3/1960 | Herzog et al. | 195—51 |
| 2,960,436 | 11/1960 | Thoma et al. | 195—51 |
| 3,214,448 | 10/1965 | Holmlund et al. | 195—51 |
| 3,254,098 | 5/1966 | Edwards et al. | 195—51 |
| 3,324,153 | 6/1967 | Pan et al. | 195—51 |

ALVIN E. TANENHOLTZ, *Primary Examiner.*

K466a

PO-1050
(5/69)

UNITED STATES PATENT OFFICE
CERTIFICATE OF CORRECTION

Patent No. 3,429,778      Dated February 25, 1969

Inventor(s) Samuel Cheng Pan et al.

It is certified that error appears in the above-identified patent and that said Letters Patent are hereby corrected as shown below:

Column 2, line 41, change $NH_4H_2PO_2$ to $NH_4H_2PO_4$; line 62, change o to of.
Column 3, line 14, change o to of; line 22, change 9 to 19; line 53, change ollowing to following; line 62, change 285 to 280.
Column 4, line 65, claim 1, change non to nor.

SIGNED AND
SEALED

NOV 18 1969

(SEAL)
Attest:

Edward M. Fletcher, Jr.
Attesting Officer

WILLIAM E. SCHUYLER, JR.
Commissioner of Patents